United States Patent
Furuichi

(10) Patent No.: US 7,350,631 B2
(45) Date of Patent: Apr. 1, 2008

(54) AUTOMATIC TRANSMISSION

(75) Inventor: Jun Furuichi, Shizuoka (JP)

(73) Assignee: Jatco Ltd, Shizuoka (JP)

( * ) Notice: Subject to any disclaimer, the term of this patent is extended or adjusted under 35 U.S.C. 154(b) by 250 days.

(21) Appl. No.: 11/217,326

(22) Filed: Sep. 2, 2005

(65) Prior Publication Data
US 2006/0049017 A1 Mar. 9, 2006

(30) Foreign Application Priority Data
Sep. 6, 2004 (JP) ............................. 2004-257807

(51) Int. Cl.
*F16D 25/0638* (2006.01)
*F16D 13/68* (2006.01)
(52) U.S. Cl. .............. 192/30 W; 192/70.12; 192/70.2; 192/85 AA
(58) Field of Classification Search ............. 192/30 W, 192/70.2
See application file for complete search history.

(56) References Cited
U.S. PATENT DOCUMENTS 5,269,201 A * 12/1993 Uematsu .................. 74/606 R
5,755,314 A * 5/1998 Kanda et al. ............. 192/70.12
6,047,803 A   4/2000 Pinschmidt et al.
2004/0094383 A1* 5/2004 Kinoshita et al. ....... 192/85 AA

FOREIGN PATENT DOCUMENTS

| JP | 54-16060 |   | 2/1979 |
| JP | 54016060 A | * | 2/1979 |
| JP | 10-339368 A |   | 12/1998 |
| JP | 2000-39031 A |   | 2/2000 |

* cited by examiner

*Primary Examiner*—Richard M Lorence
(74) *Attorney, Agent, or Firm*—Foley & Lardner LLP

(57) ABSTRACT

An automatic transmission includes a clutch drum formed, by press forming, with splines including recessed portions and raised portions, and engaging with clutch plates; and a rotational speed measuring device configured to measure a rotational speed of the clutch drum, and including a surface sensing device disposed outside an outer surface of the clutch drum, and configured to sense movement of the recessed portions and the raised portions of the splines. The clutch drum includes first openings each formed in one of the recessed portions recessed radially inwards, and each confronting the clutch plates radially.

8 Claims, 4 Drawing Sheets

AUTOMATIC TRANSMISSION

BACKGROUND OF THE INVENTION

The present invention relates to an arrangement of lubricant oil passages in an automatic transmission.

Japanese Patent Application Publication No. H10 (1998)-339368 shows an automatic transmission including a clutch drum formed, by press forming, with splines including raised portions and recessed portions, a rotational speed measuring device configured to measure a rotational speed of the clutch drum in accordance with an outer surface of splines of the clutch drum with the raised portions and the recessed portions, and oil holes each formed in one of the raised portions raised radially outwards, and arranged to discharge oil in the clutch drum. The rotational speed measuring device of this document is located at a position being different from positions of the oil holes in the axial direction of the clutch drum.

SUMMARY OF THE INVENTION

In the apparatus of this patent document, the oil holes and the rotational speed measuring device need to be located at axial positions so that each of the oil holes and the rotational speed measuring device do not overlap each other in the axial direction, for the accurate measurement of the rotational speed of the clutch drum. Moreover, for the reduction in the possibility of the seizure of clutch plates and the increase in the friction by shearing force of the oil between the clutch plates, there is a need to provide oil holes located just above the clutch plates in the radial direction. Therefore, there is a problem with the increase in size of the clutch drum.

It is an object of the present invention to provide an automatic transmission which measures a rotational speed of a clutch drum accurately, which discharges lubricant oil efficiently, and which improves reduction in size of the clutch drum.

According to one aspect of the present invention, an automatic transmission comprises: a clutch drum formed, by press forming, with splines including recessed portions and raised portions, and engaging with clutch plates; and a rotational speed measuring device configured to measure a rotational speed of the clutch drum, and including a surface sensing device disposed outside an outer surface of the clutch drum, and configured to sense movement of the recessed portions and the raised portions of the splines. The clutch drum includes first openings each formed in one of the recessed portions recessed radially inwards, and each confronting the clutch plates radially.

According to another aspect of the invention, an automatic transmission comprises: a clutch drum formed, by press forming, with splines including recessed portions and raised portions, and engaging with clutch plates; and a rotational speed measuring device configured to measure a rotational speed of the clutch drum, and including a surface sensing device disposed outside an outer surface of the clutch drum, and configured to sense movement of the recessed portions and the raised portions of the splines. The clutch drum includes a first opening which is formed in one of the recessed portions recessed radially inwards, and which is formed to overlap the clutch plates in an axial direction of the clutch drum.

DETAILED DESCRIPTION OF THE INVENTION

Figure 1:
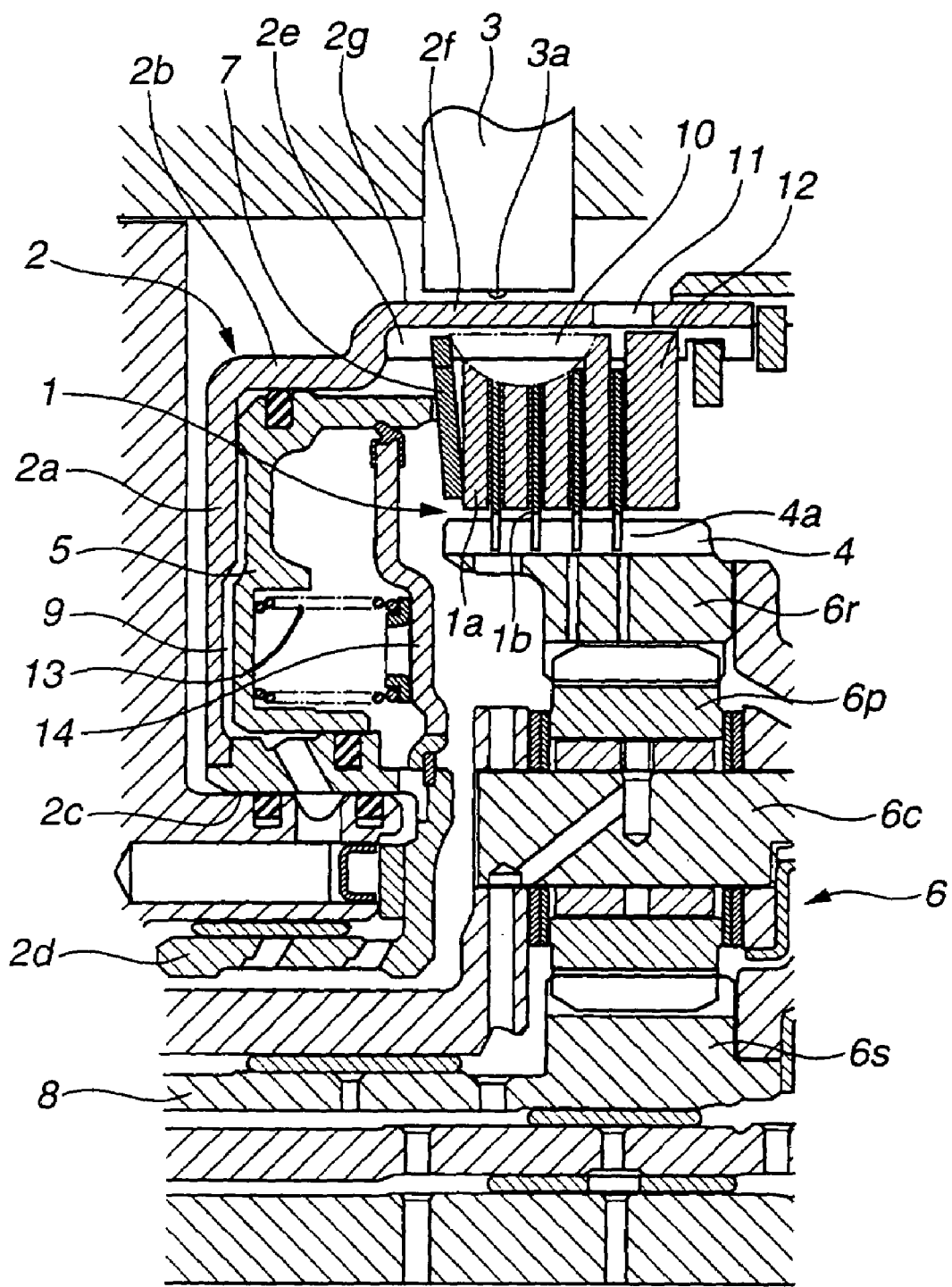
FIG. 1 is a view showing a clutch mechanism according to a first embodiment of the present invention.
Figure 2:
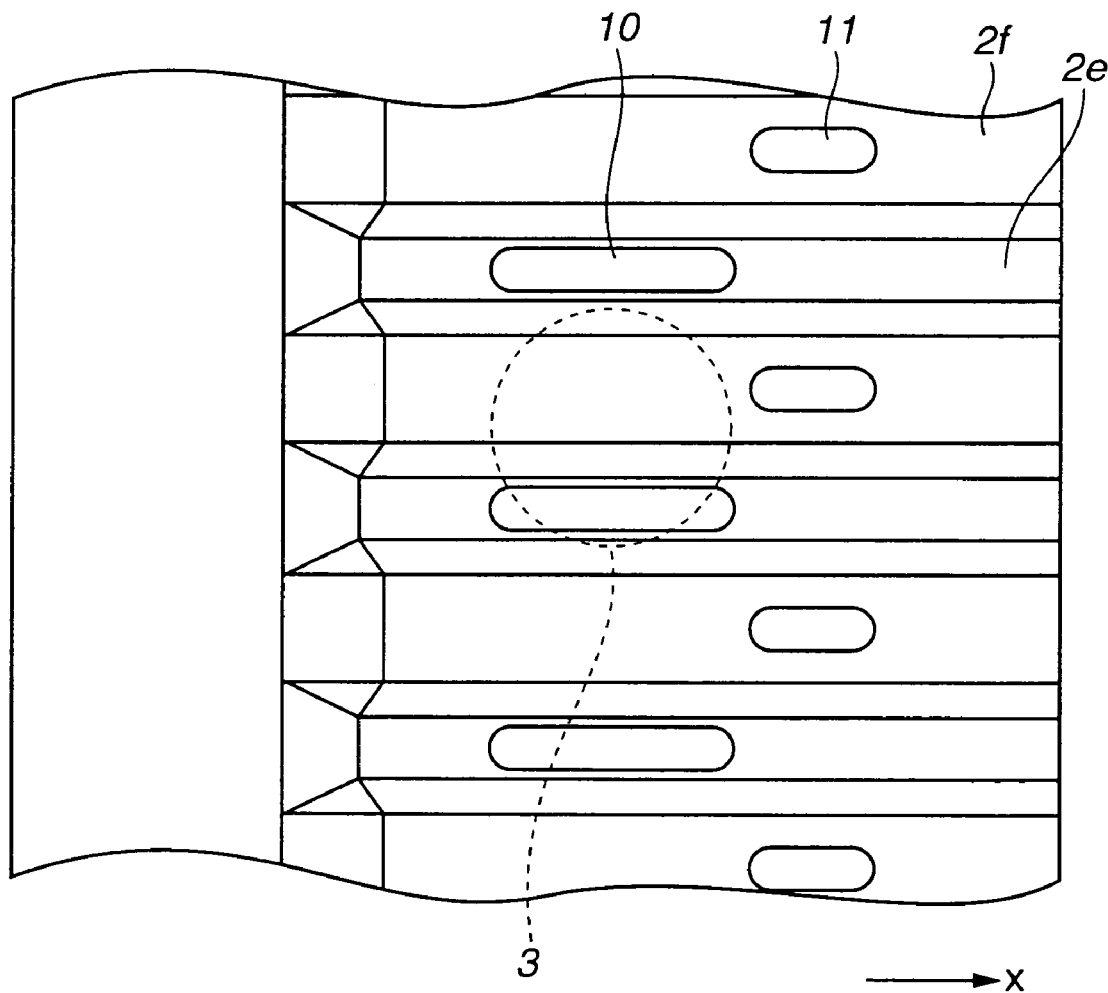
FIG. 2 is a view showing a clutch drum of the clutch mechanism of FIG. 1, as viewed radially from a rotational speed measuring device to a center axis of clutch drum.

FIG. 1 shows a clutch mechanism according to a first embodiment of the present invention. FIG. 2 shows a clutch drum 2, as viewed radially from a rotational speed measuring device 3 to a center axis of the clutch drum 2.

The clutch mechanism includes clutch plates 1 made of friction material, clutch drum 2 including splines 2g engaging with the outer circumference of clutch plates 1, and rotational speed sensor or rotational speed measuring device 3 configured to measure or determine a rotational speed by the outside surface on outer side of clutch drum 2 with raised portions and recessed portions.

Clutch drum 2 includes a bottom wall portion 2a, an outer cylindrical portion 2b, a central cylindrical portion 2c, and an inner cylindrical portion 2d. Outer cylindrical portion 2b extends axially from the outer circumference of bottom wall portion 2a. Central cylindrical portion 2c extends from the inner circumference of bottom wall portion 2a in a positive direction of x-axis of FIG. 1. Inner cylindrical portion 2d with a smaller diameter extends in a negative direction of x-axis of FIG. 1 by turning back a forward end of central cylindrical portion 2c. Clutch drum 2 encloses a clutch piston 5 slidably movable in the axial direction, and arranged to push clutch plates 1. Clutch piston 5, bottom wall portion 2a, outer cylindrical portion 2b, and central cylindrical portion 2c define a piston hydraulic chamber 9. A return spring 13 and a spring retainer 14 for supporting return spring 13 are arranged to push clutch piston 5 in the negative direction of x-axis of FIG. 1. Outer cylindrical portion 2b is formed with splines 2g by press forming, except for a cylindrical portion of piston hydraulic chamber 9 in which clutch piston 5 moves slidably. Splines 2g extends axially and includes recessed portions 2e and raised portions 2f. Spline recessed portions 2e are recessed with respect to a radial outward direction as viewed from the positive direction of x-axis of FIG. 1. Spline raised portions 2f are raised with respect to the radial outward direction as viewed from the positive direction of x-axis of FIG. 1.

Clutch plates 1 include outer plates 1a and inner plates 1b. Outer plates 1a are fit in and splined to splines 2g in outer cylindrical portion 2b of clutch drum 2. Inner plates 1b are fit over and splined to splines 4a formed in clutch hub 4. Outer plates 1a and inner plates 1b are arranged alternately so that outer plates 1a and inner plates 1b are engaged by being compressed by clutch piston 5 through a dish plate 7. Friction members made of friction material are provided on surfaces of at least one set of outer plates 1a and inner plates 1b. Outer plates 1a and inner plates 1b are engaged, and thereby clutch drum 2 rotates as a unit with clutch hub 4. Between clutch plates 1 and clutch piston 5, there is provided dish plate 7 for absorbing the impact by the pressure of clutch piston 5. In an end portion of clutch plates 1 in the positive direction of x-axis of FIG. 1, there is provided a retaining plate 12 for supporting the pressure against clutch plates 1.

In outer cylindrical portion 2b of clutch drum 2, there are provided spline recessed portions 2e being recessed portions of splines 2g, spline raised portions 2f being raised portions of splines 2g, recessed portion oil holes or first openings 10, and raised portion oil holes or second openings 11. Spline recessed portions 2e are recessed radially inwards. Spline raised portions 2f are raised radially outwards. Each of recessed portion oil holes 10 is formed in one of spline recessed portions 2e. Each of raised portion oil holes 11 is formed in one of spline raised portions 2f. Recessed portion oil holes 10 and raised portion oil holes 11 are through holes or discharge holes for discharging lubricating oil to lubricate clutch plates 1. Recessed portion oil holes 10 are located just above clutch plates 1 in the radial direction. Recessed portion oil holes 10 are formed to confront clutch plates 1 radially, and extend over clutch plates 1 in the axial direction. Raised portion oil holes 11 are formed to confront clutch plates 1 radially. As shown in FIG. 2, each of recessed portion oil holes 10 is in the form of an oval shape (or a shape of a racetrack), and extends in the axial direction. Each of raised portion oil holes 11 is in the form of an oval shape (or a shape of a racetrack), and extends in the axial direction. Each of recessed portion oil holes 10 and one of raised portion oil holes 11 are located at axial positions so as not to overlap each other in the axial direction.

Rotational speed sensor or rotational speed measuring device 3 includes a sensing portion or surface sensing device 3a located at an end portion of rotational speed measuring device 3, and configured to sense movement of recessed portions 2e and raised portions 2f of splines 2g. Rotational speed measuring device 3 is so disposed that surface sensing device 3a is located near the outer surface of clutch drum 2, and faces radially toward a rotation axis of clutch drum 2. Rotational speed measuring device 3 is located at an axial position to confront recessed portion oil holes 10 radially, and not to confront raised portion oil holes 11 radially.

A planetary gear set 6 is disposed radially inside clutch hub 4. Planetary gear set 6 includes a sun gear 6s rotating as a unit with an outer shaft 8; a plurality of pinions 6p each engaging with sun gear 6s at the outer circumference thereof; a ring gear 6r engaging with pinions 6p; and a pinion carrier 6c rotatably supporting pinions 6p. Sun gear 6s is an integral part of outer shaft 8. Ring gear 6r is an integral part of clutch hub 4.

The thus-constructed clutch mechanism is operated as follows.

When the oil pressure is supplied to piston hydraulic chamber 9, clutch piston 5 is slidably moved in the positive direction of x-axis of FIG. 1, and then compresses clutch plates 1 through dish plate 7. Outer plates 1a and inner plates 1b are engaged by the pressure against clutch plates 1, and thereby clutch drum 2 rotates as a unit with clutch hub 4. When the oil pressure is not supplied to piston hydraulic chamber 9, clutch piston 5 is moved (urged) in the negative direction of x-axis of FIG. 1, and then outer plates 1a and inner plates 1b are released. Clutch drum 2 and clutch hub 4 rotate individually.

Oil for cooling clutch plates 1 and lubricating members or internal parts of the clutch mechanism is supplied by oil passages provided in the members of the clutch mechanism. The oil cools clutch plates 1, and then is discharged from recessed portion oil holes 10 and raised portion oil holes 11.

Rotational speed measuring device 3 measures the rotational speed of clutch drum 2 in accordance with variation in magnetic flux at raised surfaces of the outer circumference of splines 2g provided in outer cylindrical portion 2b of clutch drum 2.

Because recessed portion oil holes 10 in clutch drum 2 do not affect the measurement of the rotational speed by rotational speed measuring device 3, rotational speed measuring device 3 can be located at a position to confront recessed portion oil holes 10 radially. Therefore, even when there is not enough space in the axial direction to dispose rotational speed measuring device 3, rotational speed measuring device 3 can be disposed appropriately.

Because recessed portion oil holes 10 are formed to confront clutch plates 1 radially, the oil for cooling clutch plates 1 can be discharged efficiently. Therefore, this arrangement according to the first embodiment prevents the increase in the oil temperature and the build-up of the oil between clutch plates 1. Moreover, this arrangement reduces the possibility of the seizure of clutch plates 1 and the friction by shearing force of the oil.

By being formed with raised portion oil holes 11, the oil in the inner circumference of raised portions of splines 2g can be discharged, and thereby this arrangement prevents the increase in the oil temperature and the build-up of the oil between clutch plates 1. Therefore, this arrangement reduces the possibility of the seizure of clutch plates 1 and the friction by shearing force of the oil.

Recessed portion oil holes 10 are formed in a position closer to bottom wall portion 2a than raised portion oil holes 11, and thereby the oil flowing from bottom wall portion 2a to outer cylindrical portion 2b can be discharged from recessed portion oil holes 10, and then the oil which was not discharged from recessed portion oil holes 10 is discharged surely from raised portion oil holes 11. Accordingly, this arrangement reduces the possibility of the seizure of clutch plates 1 and the friction by shearing force of the oil. Moreover, because recessed portion oil holes 10 do not affect the measurement of the rotational speed by rotational speed measuring device 3, it is optional to enlarge recessed portion oil holes 10, and thereby most of the oil can be discharged from recessed portion oil holes 10.

Figure 3:
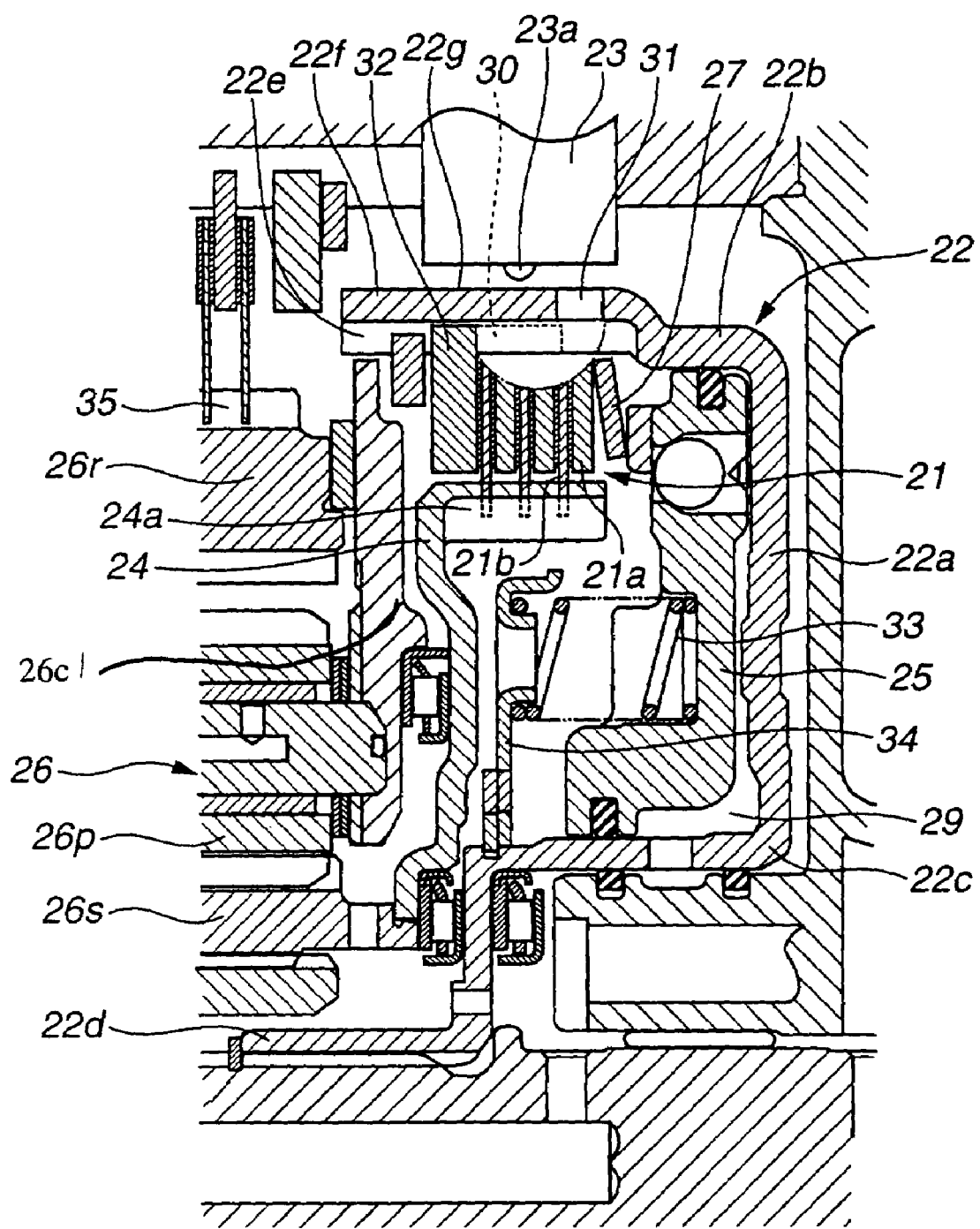
FIG. 3 is a view showing a clutch mechanism according to a second embodiment of the present invention.
Figure 4:
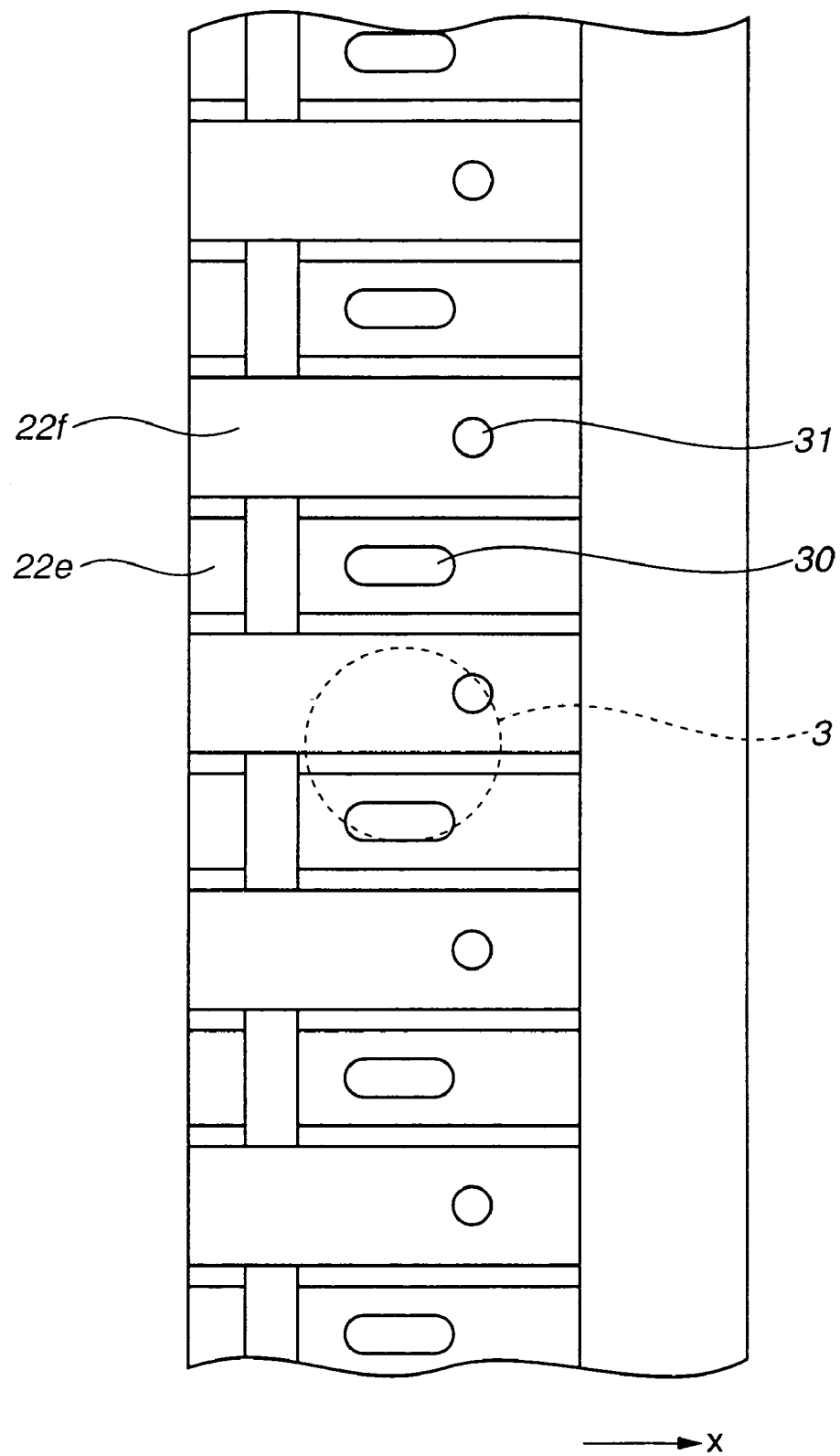
FIG. 4 is a view showing a clutch drum of the clutch mechanism of FIG. 3, as viewed radially from a rotational speed measuring device to a center axis of clutch drum.

FIG. 3 shows a clutch mechanism according to a second embodiment of the present invention, formed with through holes or discharge holes for the oil located at positions being different from positions of the through holes according to the first embodiment. FIG. 4 shows a clutch drum 22, as viewed radially from a rotational speed measuring device 23 to a center axis of the clutch drum 22.

The clutch mechanism includes clutch plates 21 made of friction material, clutch drum 22 including splines 22g engaging with the outer circumference of clutch plates 21, and rotational speed sensor or rotational speed measuring device 23 configured to measure or determine a rotational speed by the outside surface on outer side of clutch drum 22 with raised portions and recessed portions.

Clutch drum 22 includes a bottom wall portion 22a, an outer cylindrical portion 22b, a central cylindrical portion 22c, and an inner cylindrical portion 22d. Outer cylindrical portion 22b extends from the outer circumference of bottom wall portion 22a in a negative direction of x-axis of FIG. 3. Central cylindrical portion 22c extends from the inner circumference of bottom wall portion 22a in the negative direction of x-axis of FIG. 3. Inner cylindrical portion 22d with a smaller diameter extends in the negative direction of x-axis of FIG. 3 by bending a forward end of central cylindrical portion 22c. Clutch drum 22 encloses a clutch piston 25 slidably movable in the axial direction, and arranged to push clutch plates 21. Clutch piston 25, bottom wall portion 22a, outer cylindrical portion 22b, and central cylindrical portion 22c define a piston hydraulic chamber 29. A return spring 33 and a spring retainer 34 for supporting return spring 33 are arranged to push clutch piston 25 in a positive direction of x-axis of FIG. 3. Outer cylindrical portion 22b is formed with splines 22g by press forming, except for a cylindrical portion of piston hydraulic chamber 29 in which clutch piston 25 moves slidably. Splines 22g extends axially and includes recessed portions 22e and raised portions 22f. Spline recessed portions 22e are recessed with respect to a radial outward direction as viewed from the positive direction of x-axis of FIG. 3. Spline raised portions 22f are raised with respect to the radial outward direction as viewed from the positive direction of x-axis of FIG. 3.

Clutch plates 21 include outer plates 21a and inner plates 21b. Outer plates 21a are fit in and splined to splines 22g in outer cylindrical portion 22b of clutch drum 22. Inner plates 21b are fit over and splined to splines 24a formed in clutch hub 24. Outer plates 21a and inner plates 21b are arranged alternately so that outer plates 21a and inner plates 21b are engaged by being compressed by clutch piston 25 through a dish plate 27. Friction members made of friction material are provided on surfaces of at least one set of outer plates 21a and inner plates 21b. Outer plates 21a and inner plates 21b are engaged, and thereby clutch drum 22 rotates as a unit with clutch hub 24. Between clutch plates 21 and clutch piston 25, there is provided dish plate 27 for absorbing the impact by the pressure of clutch piston 25. In an end portion of clutch plates 21 in the negative direction of x-axis of FIG. 3, there is provided a retaining plate 32 for supporting the pressure against clutch plates 21.

In outer cylindrical portion 22b of clutch drum 22, there are provided spline recessed portions 22e being recessed portions of splines 22g, spline raised portions 22f being raised portions of splines 22g, recessed portion oil holes or first openings 30, and raised portion oil holes or second openings 31. Spline recessed portions 22e are recessed radially inwards. Spline raised portions 22f are raised radially outwards. Each of recessed portion oil holes 30 is formed in one of spline recessed portions 22e. Each of raised portion oil holes 31 is formed in one of spline raised portions 22f. Recessed portion oil holes 30 and raised portion oil holes 31 are through holes for discharging lubricating oil to lubricate clutch plates 21. Recessed portion oil holes 30 are located just above clutch plates 21 in the radial direction. Recessed portion oil holes 30 are formed to confront clutch plates 21 radially, and extend over clutch plates 21 in the axial direction. Raised portion oil holes 31 are located just above clutch plates 21 in the radial direction. Raised portion oil holes 31 are formed to confront clutch plates 21 radially, and extend over clutch plates 21 in the axial direction. As shown in FIG. 4, each of recessed portion oil holes 30 is in the form of an oval shape (or a shape of a racetrack), and extends in the axial direction. Each of raised portion oil holes 31 is in the form of a circular shape. Each of recessed portion oil holes 30 and one of raised portion oil holes 31 are located at axial positions so as to overlap each other partly in the axial direction.

Rotational speed sensor or rotational speed measuring device 23 includes a sensing portion or surface sensing device 23a located at an end portion of rotational speed measuring device 23, and configured to sense movement of recessed portions 22e and raised portions 22f of splines 22g. Rotational speed measuring device 23 is so disposed that surface sensing device 23a is located near the outer surface of clutch drum 22, and faces radially toward a rotation axis of clutch drum 22. Rotational speed measuring device 23 is located at an axial position so that surface sensing device 23 confronts recessed portion oil holes 30 radially, and that surface sensing device 23 does not confront raised portion oil holes 31 radially.

A planetary gear set 26 includes a sun gear 26s rotating as a unit with clutch hub 24; a plurality of pinions 26p each engaging with sun gear 26s at the outer circumference thereof; a ring gear 26r engaging with pinions 26p; and a pinion carrier 26c rotatably supporting pinions 26p. Sun gear 26s is connected with clutch hub 24. Ring gear 26r is an integral part of a brake hub 35.

The thus-constructed clutch mechanism is operated as follows.

When the oil pressure is supplied to piston hydraulic chamber 29, clutch piston 25 is slidably moved in the negative direction of x-axis of FIG. 3, and then compresses clutch plates 21 through dish plate 27. Outer plates 21a and inner plates 21b are engaged by the pressure against clutch plates 21, and thereby clutch drum 22 rotates as a unit with clutch hub 24. When the oil pressure is not supplied to piston hydraulic chamber 29, clutch piston 25 is moved (urged) in the positive direction of x-axis of FIG. 3, and outer plates 21a and inner plates 21b are released. Clutch drum 22 and clutch hub 24 rotate separately.

Oil for cooling clutch plates 21 and lubricating members or internal parts of the clutch mechanism is supplied by oil passages provided in the members of the clutch mechanism. The oil cools clutch plates 21, and then is discharged from recessed portion oil holes 30 and raised portion oil holes 31.

Rotational speed measuring device 23 measures the rotational speed of clutch drum 22 in accordance with variation in magnetic flux at raised surfaces of the outer circumference of splines 22g provided in outer cylindrical portion 22b of clutch drum 22. Rotational speed measuring device 23 is located at the axial position so that surface sensing device 23a is separated from raised portion oil holes 31 in the axial direction of clutch drum 22. Therefore, raised portion oil holes 31 do not affect the measurement of the rotational speed by rotational speed measuring device 23.

Recessed portion oil holes 30 and raised portion oil holes 31 are formed to confront clutch plates 21 radially, and thereby the oil for cooling clutch plates 21 can be discharged efficiently. Moreover, this arrangement according to the second embodiment prevents the increase in the oil temperature and the build-up of the oil between clutch plates 21. Therefore, this arrangement reduces the possibility of the seizure of clutch plates 21 and the friction by shearing force of the oil.

Each of recessed portion oil holes 30 and one of raised portion oil holes 31 are located at axial positions so as to overlap each other partly in the axial direction of the clutch drum 22, and thereby are surely formed to confront clutch plates 21 radially. Therefore, the oil for cooling clutch plates 21 can be discharged efficiently. Moreover, this arrangement prevents the increase in the oil temperature and the build-up of the oil between clutch plates 21. Therefore, this arrangement reduces the possibility of the seizure of clutch plates 21 and the friction by shearing force of the oil.

This application is based on a prior Japanese Patent Application No. 2004-257807. The entire contents of the Japanese Patent Application No. 2004-257807 with a filing date of Sep. 6, 2004 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
   a clutch drum formed, by press forming, with splines including recessed portions and raised portions and engaging with clutch plates; and
   a rotational speed measuring device configured to measure a rotational speed of the clutch drum, and including a surface sensing device disposed outside an outer surface of the clutch drum, and configured to sense movement of the recessed portions and the raised portions of the splines;
   the clutch drum including first openings each formed in one of the recessed portions recessed radially inwards, and each confronting the clutch plates radially,
   wherein the rotational speed measuring device confronts the first openings of the clutch drum radially.

2. The automatic transmission as claimed in claim 1, wherein each of the first openings of the clutch drum extends over the clutch plates in an axial direction of the clutch drum.

3. An automatic transmission comprising:
   a clutch drum formed, by press forming, with splines including recessed portions and raised portions and engaging with clutch plates; and
   a rotational speed measuring device configured to measure a rotational speed of the clutch drum, and including a surface sensing device disposed outside an outer surface of the clutch drum, and configured to sense movement of the recessed portions and the raised portions of the splines;
   the clutch drum including first openings each formed in one of the recessed portions recessed radially inwards, and each confronting the clutch plates radially,
   wherein the clutch drum includes second openings each formed in one of the raised portions raised radially outwards, and each located at an axial position which is near one of the first openings of the clutch drum, and which is separated from the surface sensing device in an axial direction of the clutch drum.

4. The automatic transmission as claimed in claim 3, wherein the clutch drum includes a bottom wall portion and a cylindrical portion; and the first openings of the clutch drum are located at an axial position between the bottom wall portion and the second openings of the clutch drum.

5. The automatic transmission as claimed in claim 3, wherein each of the first openings and one of the second openings of the clutch drum partly overlap each other in the axial direction of the clutch drum.

6. The automatic transmission as claimed in claim 3, wherein the rotational speed measuring device overlaps the second openings of the clutch drum in the axial direction so that the surface sensing device of the rotational speed measuring device does not overlap the second openings of the clutch drum in the axial direction.

7. The automatic transmission as claimed in claim 4, wherein the cylindrical portion of the clutch drum is formed with the splines including the recessed portions and the raised portions, and extending in the axial direction of the clutch drum; the surface sensing device of the rotational speed measuring device faces radially toward a rotation axis of clutch drum; and each of the first openings of the clutch drum extends in the axial direction of the clutch drum, and are in the form of an elongated shape.

8. An automatic transmission comprising:
   a clutch drum formed, by press forming, with splines including recessed portions and raised portions, and engaging with clutch plates; and
   a rotational speed measuring device configured to measure a rotational speed of the clutch drum, and including a surface sensing device disposed outside an outer surface of the clutch drum, and configured to sense movement of the recessed portions and the raised portions of the splines;
   the clutch drum including a first opening which is formed in one of the recessed portions recessed radially inwards, and which is formed to overlap the clutch plates in an axial direction of the clutch drums,
   wherein the rotational speed measuring device confronts the first opening of the clutch drum radially.

* * * * *